United States Patent
Nesse et al.

(10) Patent No.: US 6,186,706 B1
(45) Date of Patent: Feb. 13, 2001

(54) METHOD AND EQUIPMENT FOR PROCESSING CARBON BODIES

(75) Inventors: Oddvin Nesse; Hogne Linga, both of Årdalstangen; Odd Hagen, Øvre Årdal, all of (NO)

(73) Assignee: Norsk Hydro ASA, Oslo (NO)

(*) Notice: Under 35 U.S.C. 154(b), the term of this patent shall be extended for 0 days.

(21) Appl. No.: 09/174,556

(22) Filed: Oct. 19, 1998

(30) Foreign Application Priority Data

Oct. 17, 1997 (NO) .................................................. 974794

(51) Int. Cl.$^7$ ...................................................... B23C 5/20
(52) U.S. Cl. .................. 408/1 R; 408/223; 408/224; 82/1.4; 82/1.5; 407/42
(58) Field of Search ............................. 408/1 R, 223, 408/144, 224, 145; 407/42, 35, 43, 53, 57, 64, 61; 82/1.5, 1.2, 1.3, 1.4

(56) References Cited

U.S. PATENT DOCUMENTS

| | | | |
|---|---|---|---|
| 521,430 | * 6/1894 | Bourgeous | 82/1.5 |
| 2,215,939 | * 9/1940 | Shaw | 82/1.5 |
| 3,796,853 | * 3/1974 | Matsuo et al. | 219/145 |
| 4,487,275 | * 12/1984 | Froehlich | 82/1.5 X |
| 4,564,321 | * 1/1986 | Kondo et al. | 408/224 X |
| 4,651,374 | 3/1987 | Turchan . | |
| 4,681,485 | * 7/1987 | Koelewijn | 407/53 X |
| 4,938,291 | * 7/1990 | Lynude et al. | 82/1.5 X |
| 5,094,573 | 3/1992 | Hougen . | |
| 5,150,518 | * 9/1992 | Fuchs | 82/1.4 X |
| 5,413,438 | 5/1995 | Turchan . | |
| 5,542,976 | 8/1996 | Bayer et al. . | |
| 5,730,036 | * 3/1998 | Ozaki et al. | 82/1.3 |
| 5,820,318 | * 10/1998 | Danielsson et al. | 408/224 X |
| 5,848,861 | * 12/1998 | Hansen | 408/223 X |
| 5,890,854 | * 4/1999 | Naumann et al. | 407/42 X |
| 5,947,649 | * 9/1999 | Arai et al. | 407/35 X |
| 5,957,633 | * 9/1999 | Hall | 407/224 X |

FOREIGN PATENT DOCUMENTS

| | | |
|---|---|---|
| 622 505 | 11/1994 | (EP) . |
| 764 728 | 3/1997 | (EP) . |
| 2 590 911 | 6/1987 | (FR) . |
| 1698313 | 12/1991 | (SU) . |
| WO 88/05361 | 7/1988 | (WO) . |

OTHER PUBLICATIONS

Abstract of Norwegian Application 892971.
Abstract of Norwegian Application 175356.

* cited by examiner

*Primary Examiner*—Henry W. H. Tsai
(74) *Attorney, Agent, or Firm*—Wenderoth, Lind & Ponack, L.L.P.

(57) ABSTRACT

A method and equipment with a processing tool for the processing of carbon bodies, such as formation of holes in calcined carbon bodies, in particular nipple holes in anodes for use in electrolytic cells for the production of aluminium. The equipment comprises a positioning device (2) with means for positioning and fixing the calcined carbon element (1) and a processing station (8) with at least one spindle (10) which is designed to rotate and which has a processing tool (9) with one or more cutting elements (40–45). The spindle can rotate about a horizontal axis and can be moved in three directions which are perpendicular to one another so that the axis of rotation of the spindle can be given planetary motion during processing. The processing tool can be enclosed by a sheath which may have a suction device.

19 Claims, 5 Drawing Sheets

METHOD AND EQUIPMENT FOR PROCESSING CARBON BODIES

BACKGROUND OF THE INVENTION

1. Field of the Invention

The present invention concerns a method and equipment including a processing tool for the processing of carbon bodies, such as the formation of holes in carbon bodies, in particular nipple holes in anodes for use in electrolytic cells for the production of aluminum.

2. Description of Related Art

In modern electrolysis plants for the production of aluminum, anodes are used which comprise a prebaked or calcined carbon body fastened to an anode hanger. The anode hanger usually consists of an upper part, an anode rod made of aluminum and a lower part comprising a yoke having steel nipples which extend downwards.

The carbon body is fastened to the steel part of the anode hanger using a cast iron or monolithic lining material joint. More specifically, the joint between the carbon body and the steel part is formed by the nipples in the steel part that are first arranged so that they extend downwards into holes in the carbon body and then the holes are filled with molten cast iron or having monolithic lining material pressed into them.

The holes in the carbon body are formed in the traditional manner during the forming of the carbon bodies, the so-called "green carbon", before the calcination process (prebaking process).

This results in the following disadvantages:

The green carbon must be stacked in a special way in the calcination furnaces to avoid creep and deformation of the holes. This special stacking results in additional work and reduced calcination capacity, i.e. reduced productivity.

However, even if the precautions mentioned are taken, some holes will still be deformed and, consequently, some carbon bodies will be unusable. The proportion of rejects may be as much as 10% or more in some cases.

Another problem in connection with the calcination of carbon bodies with preformed holes is that the packing material can burn fast to the walls of the holes.

Other disadvantages are that preformed nipple holes are associated with large density gradients and many small cracks in the carbon form body around the nipple hole. The cracks will result in a high electrical contact resistance, which is not very desirable during the electrolysis process as the increase in resistance can lead to an increase in the temperature in the joint between the anode and the nipple.

Another disadvantage of preforming the nipple holes is that there are restrictions to the geometry which can be formed with this technique as they are usually formed using projections in the vibration mold, which must be provided with a certain taper so that they can be withdrawn from the body when the stamping operation has finished. If undercut or conical nipple holes are to be formed, which will gradually become more common, the hole must be processed further.

Several solutions are proposed for cleaning the nipple holes of an anode after calcination. For example, FR 2 590 911 shows a two-part cleaning tool for nipple holes in which a first, outer part is designed to clean grooves in the walls of the hole while a second part is designed to smooth the peripheral surface and base of the hole. The latter part is driven by a rotating shaft while the first part is arranged coaxially and supported freely in relation to the shaft. This equipment, which, among other things, is designed to clean grooves in the walls of the hole by means of axial motion, will be limited to cleaning preformed holes.

EP 0 764 728 A 1 shows equipment for processing three nipple holes in one anode. The equipment comprises a centering device for centering an anode with performed holes, a liftable/lowerable support for the anode and three downward-facing spindles each with its own milling head for processing the anode's holes.

In the above publication, it is suggested that it would be conceivable to form holes in anode blocks without preformed holes with the processing tool and, moreover, that this can be done with sufficient precision. However, no indication of what such a tool would look like is given.

SUMMARY OF THE INVENTION

The present invention represents a method and apparatus for the formation of holes in carbon bodies after they have been calcined, whereby the geometry of the holes can be formed with a high degree of precision and the wear on the equipment is minimal. Further, the equipment may also serve to remove excess material of the surface of the carbon bodies, such as grading and smoothing.

The present invention makes it possible to omit the preforming of nipple holes in carbon bodies in the "green state". By omitting the preforming of the holes, the vibration time in connection with the formation of the carbon body in the "green state" is reduced and the current problems of density variations and cracks around nipple holes can be avoided.

Moreover, the present invention results in great savings during calcination as the positioning in the furnace can be simplified because the carbon bodies have no nipple holes which can creep. A reduction in the positioning time will contribute to an increase in the capacity of the furnace.

It is also possible to increase the capacity of the individual furnaces by making the firing curves steeper, i.e. the change in temperature per unit of time can be increased as the structure of the carbon bodies is more homogeneous (without nipple holes). The present invention will also mean that the cassettes in the furnace can be made fuller (increase in production) as there is no need to take into consideration how the anodes are arranged.

Moreover, the number of carbon bodies which must be rejected after calcination will be reduced as they have a simpler geometric form and are therefore less subject to deviations. Any carbon bodies which are destroyed during calcination as a result of crack formation, etc. will represent rejects at a lower cost level than previously because less work was done on them before the calcination.

Moreover, burdensome operations such as cleaning/alignment of nipple holes after calcination can be eliminated. These are operations which are burdensome when performed manually and which are also associated with the generation of fine dust and noise.

Another advantage is that a calcined carbon body can now rapidly be adapted to different designs of anode hangers so that reserve stocks of anode carbon can be reduced. Moreover, in accordance with the present invention, holes of various geometries, such as undercut (conical) or oval holes or holes with threads/tracks, may be formed simply and rapidly.

Moreover, in connection with the mechanical processing in accordance with the present invention, better (smaller)

tolerance deviations between the nipple holes will be achieved than can be achieved with the current technology.

BRIEF DESCRIPTION OF THE DRAWINGS

The present invention will be described with reference in further detail with reference to examples and the following drawings figures, where.

DETAILED DESCRIPTION OF THE INVENTION

Figure 1:
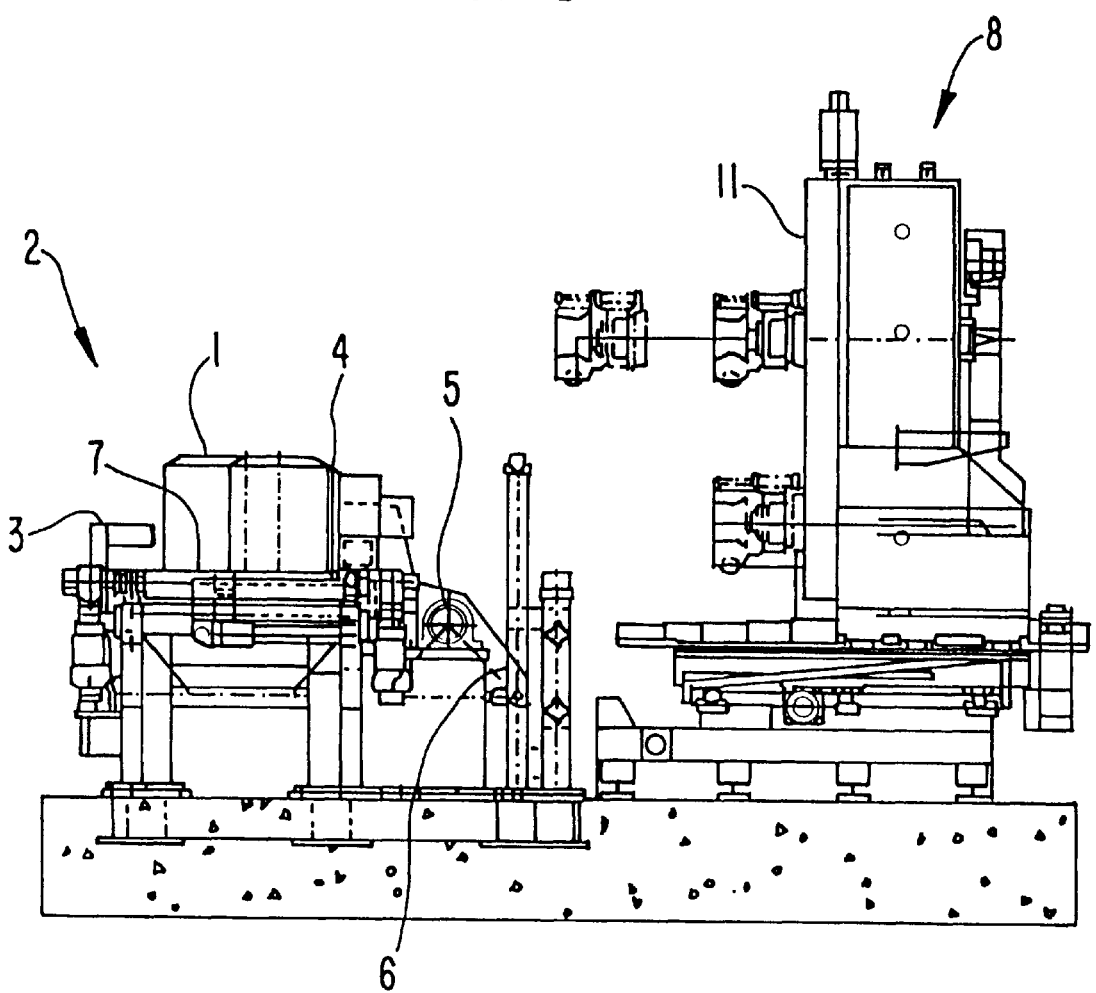
FIG. 1 shows a side view of an apparatus for the formation of holes in carbon bodies in a first position.

FIG. 1 shows an apparatus for forming of holes in carbon bodies in which a carbon body 1 is arranged on a positioning device 2. The positioning device may be arranged in connection with a conveyor track and comprises a horizontal support surface 7 and means for clamping the carbon body in the correct position in relation to the conveying direction (not shown). It is expedient for the carbon bodies to be oblong and conveyed so that the conveying direction corresponds with their longitudinal direction and, moreover, so that the surface in which the nipple holes are to be formed is facing upwards. Moreover, the positioning device comprises one or more clamping devices 3 to fix the carbon body in its transverse direction against a stopper 4.

The positioning device can position the carbon body in relation to a processing station 8 having a machining unit 11 and is designed to be swung 90 degrees around a shaft 5, for example using a linear motor (not shown) connected with an arm 6. When the linear motor is activated, the arm moves in a transverse direction in towards the conveyor track and the positioning device with the carbon body 1 swings up so that the horizontal support surface 7 is placed in a vertical position, see FIG. 2.

The machining unit 11, which is shown here generally, comprises one processing tool 9 mounted on a spindle 10, but several tools with associated spindles may also be used. It is expedient for the processing of one anode with three nipple holes to take place using three spindles working in parallel. In the embodiment shown, the spindle is arranged for rotation around a horizontal axis.

In the processing station 8, the machining unit 11 is supported on a base 12 and has a chassis 13 designed to move the machining unit in the horizontal plane, which makes it possible to machine in the depth and longitudinal directions of the carbon body. For processing in the transverse direction of the carbon body, the spindle 10 is designed to move in the vertical direction.

It is expedient for the processing station 8 to have a programmable control unit (not shown) so that the processing tool 9, using the chassis and the freedom of movement of the spindle, can assume all positions in both the horizontal plane and the vertical direction. The processing station may comprise means (not shown) which determine the form and position of the carbon body. Information on this may be included in the machine's control unit, which uses this information in connection with processing or the choice of processing program. Programmable machines such as CNC machines are well-known to machining specialists and the actual control for the machining unit will not, therefore, be described in further detail here.

Figure 2:
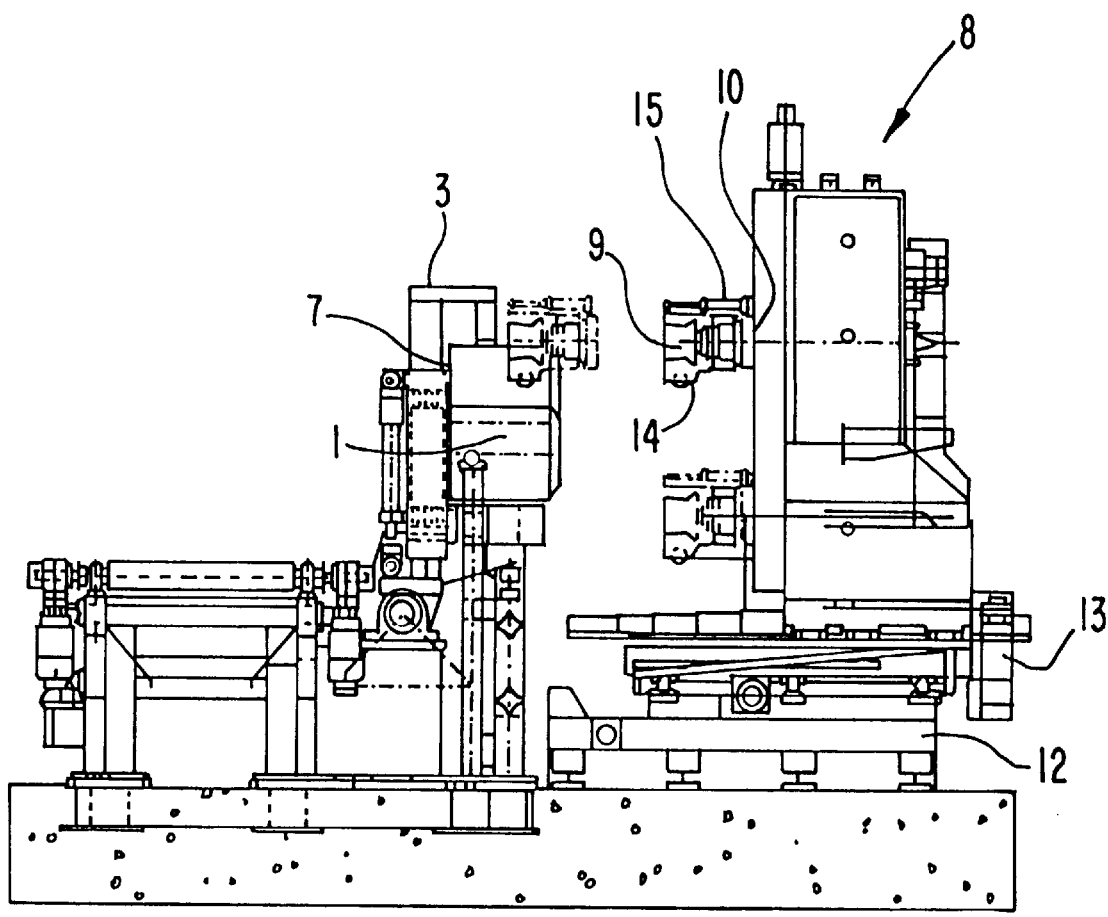
FIG. 2 shows a side view of the apparatus shown in FIG. 1 in a second position.

As shown in FIGS. 1 and 2, the processing tool 9 is mounted on the spindle 10. A yielding sheath 14 can be placed around the processing tool. The sheath is fastened to the machining unit 11 on one side and has a hole in the other side. In connection with the processing of a carbon body, the spindle with the processing tool is moved forwards towards the carbon body. The sheath is then brought into contact with and forms a seal against the surface of the carbon body. The inner space of the sheath can be connected to a suction device (not shown) so that particles and any dust formed during the processing is extracted from the processing location. Moreover, the processing tool itself may comprise means for the supply of compressed air which contributes to blowing particles and dust out of the hole which is being processed. The sheath may comprise a bellows or a similar structure and may have an actuator/linear motor 15 or a spring device (not shown) which contributes to bringing the sheath into contact with and forming a seal against the carbon body.

Moreover, the processing tool is shown in an outer and a lower position, as shown by the dotted lines in the figures.

Figure 3:
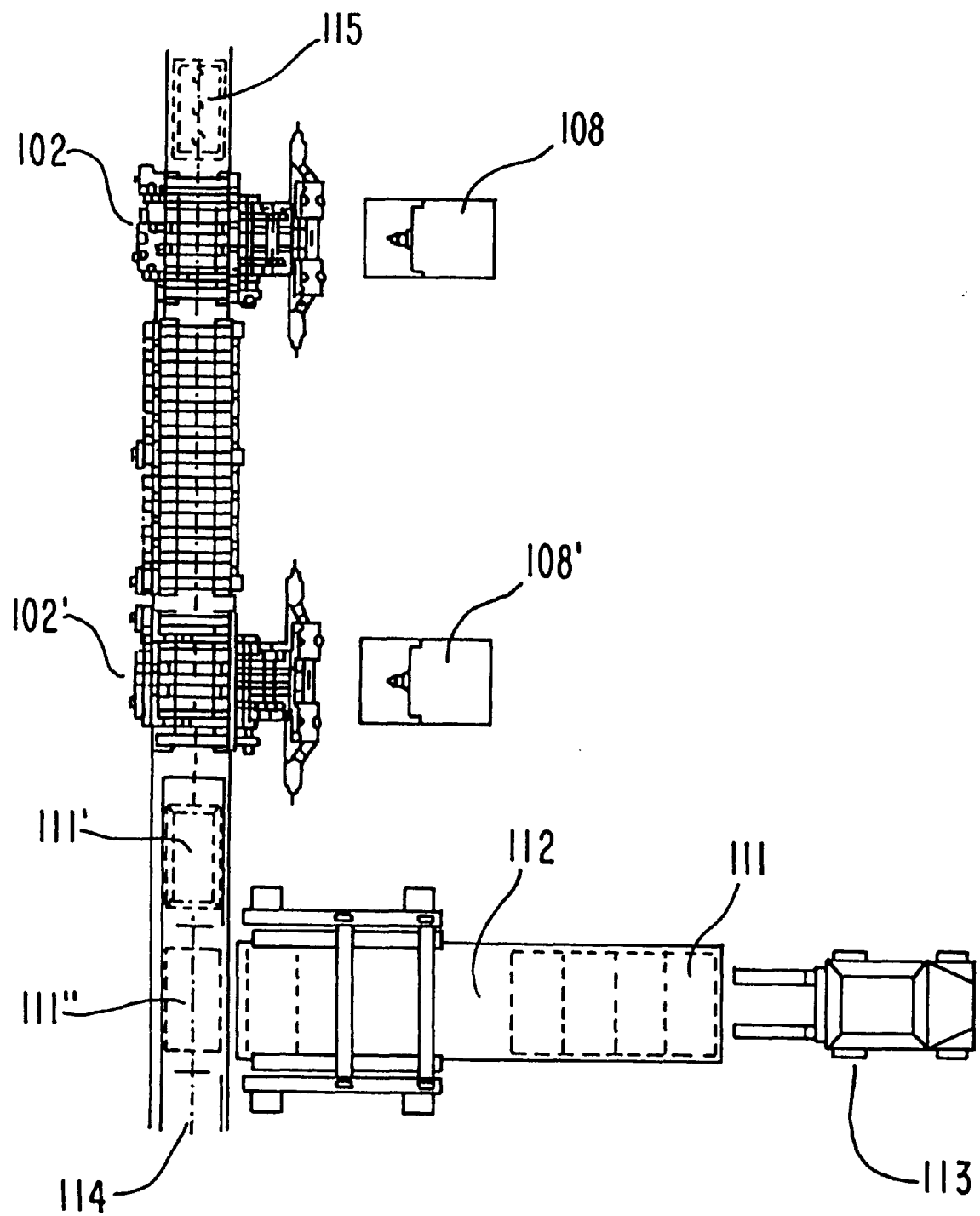
FIG. 3 shows a processing line with two processing stations as seen from above.

FIG. 3 shows, as seen from above, a processing line with two processing stations 108, 108'. Positioning devices 102, 102' are arranged in connection with the processing stations to position the carbon bodies in relation to the processing stations.

The carbon bodies 111 which are to be processed may, for example, be fed in on a conveyor track 112 by means of a truck 113 or similar device at the entrance to the conveyor track. The exit end of the conveyor track 112 may be arranged in such a way that the carbon bodies 111', 111" are fed from here onto a second conveying track 114 which runs through the positioning devices 102, 102'. Processed carbon bodies 115 are conveyed from the processing stations using the conveyor track 114 to a store which is not shown. It should be understood that the processing line can be operated so that only one processing station is in operation at a time. This makes it possible to perform inspections/maintenance on the station which is not in operation. In periods with a requirement for high production, both stations can run simultaneously in such a way that the carbon bodies which are not processed by the first station 108' are processed by the subsequent station 108. The processing stations may be equipped with different tools and also may be programmed differently for processing of carbon bodies for different types of suspension (anode hangers).

Figure 4A:
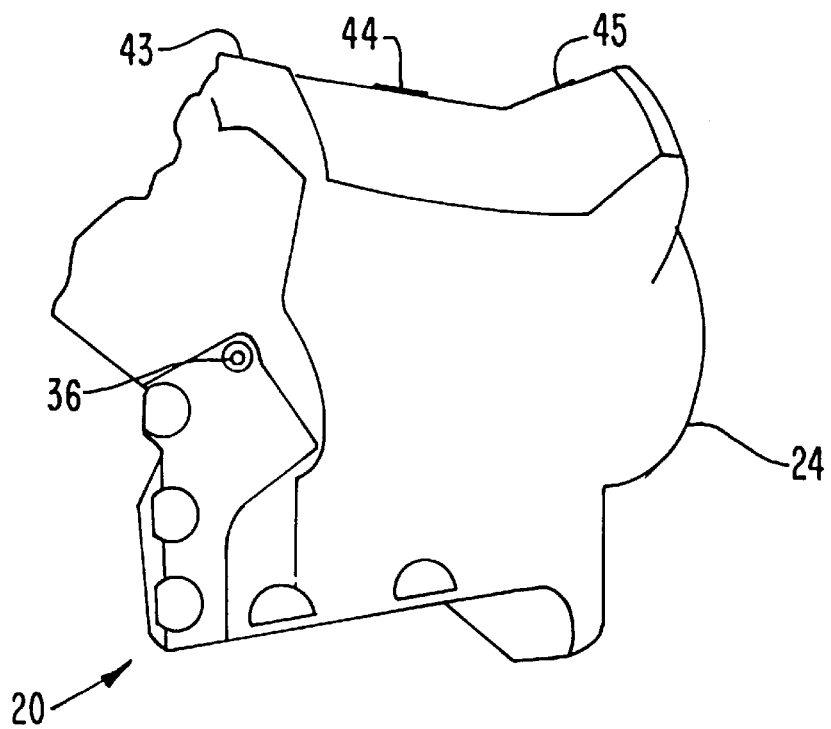
FIG. 4a shows a perspective view of a processing tool in accordance with the present invention.
Figure 4B:
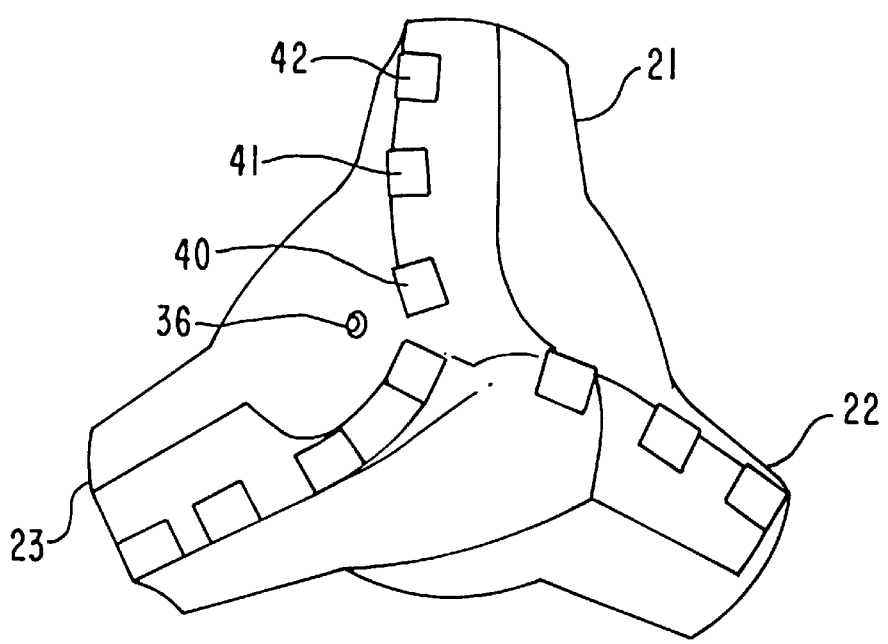
FIG. 4b shows the processing tool shown in FIG. 4a as seen from below.
Figure 5:
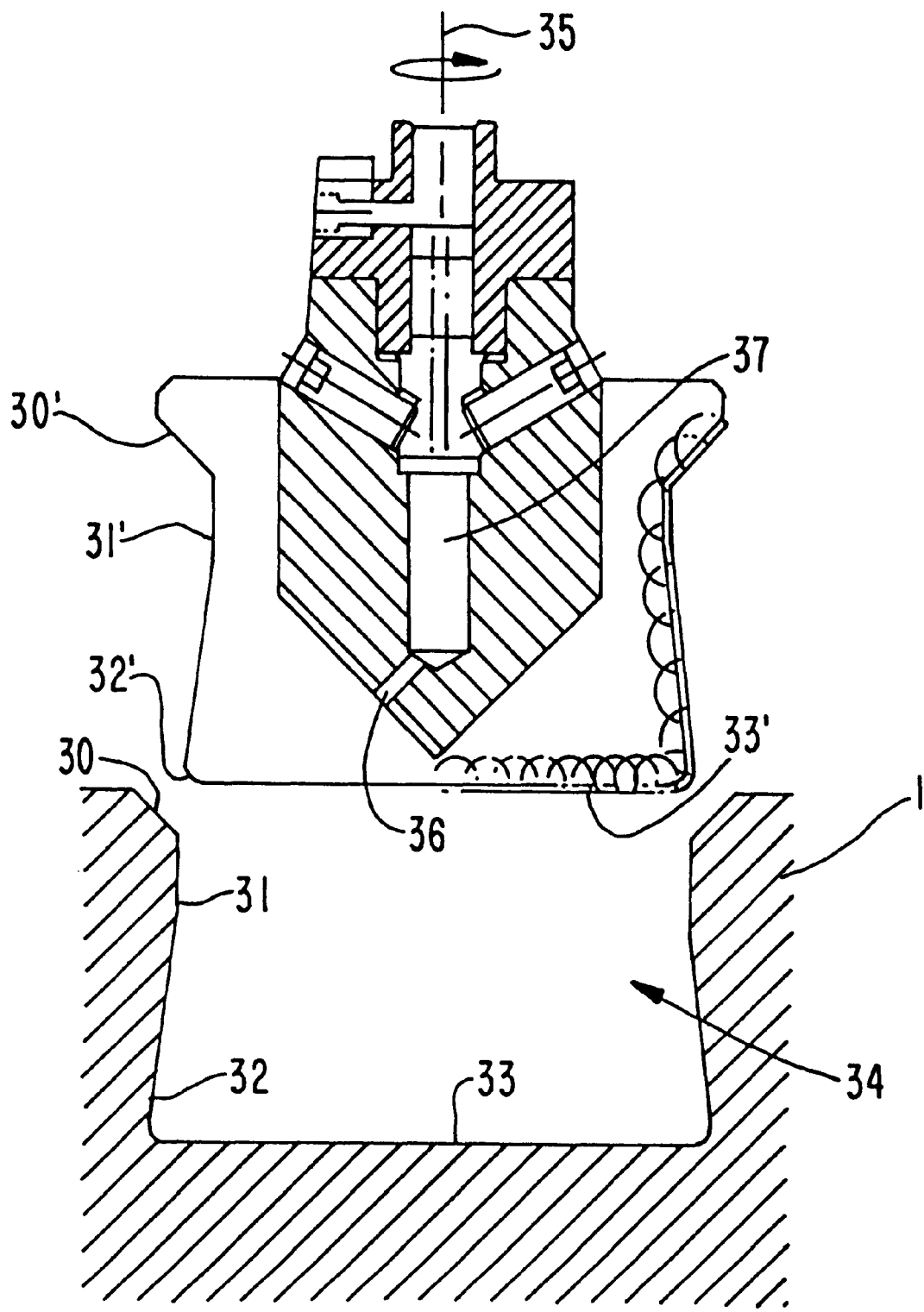
FIG. 5 shows a section through the processing tool shown in FIGS. 4a and 4b.

FIGS. 4a, 4b and 5 show a processing tool which can be used as part of the equipment. The tool shown in FIGS. 4a and 4b comprises a cutting head 20 with a mounting part 24 and three arms 21, 22, 23. The mounting part may be designed with internal threads or be designed in any other expedient manner for connection to the spindle 10. The arms have a divergent form so that the extent of the arms in the radial direction increases towards the outer end of the cutting head. Moreover, the arms have cutting elements 43, 44, 45 at their peripheral surfaces and cutting elements 40, 41, 42 at their axial surfaces. The cutting elements may expediently be formed of ceramic material, hard metal, diamond (polycrystalline) or any other known material which is suitable for the purpose. The cutting elements can be displaced regarding their mounting in the arms (asymmetric positioned) so that, during processing, the cutting elements will work in positions which are slightly displaced in relation to one another.

FIG. 5 shows a cross-section of the cutting head shown in FIGS. 4a and 4b. The cutting head comprises a channel 37 and nozzle 36 for the supply of compressed air to the base of the nipple hole. The compressed air contributes to transporting removed materials such as shavings which are produced during processing out of the hole. In the embodiment shown, the compressed air supply is used centrally through the tool while the shavings transport will take place externally in relation to the tool.

As FIG. 5 also shows, this cutting head is designed to be able to process conical nipple holes. However, it will also be possible to form cylindrical holes with the tool. The figure also shows a section through a carbon body 1 with a nipple hole 34 formed using the tool. The hole has a cylindrical hole surface 31. This is generally formed by cutting elements which are located in the area 32' on the cutting head while, during processing, the cutting head has been subject to rotation around a fixed axis. The hole surface 32 is conical and diverges towards the base of the hole. This surface is formed by the same cutting elements as stated above (32') but here the cutting head has been subject to planetary motion in its lower position, i.e. the cutting head's axis of rotation has undergone circular motion. If the cutting head's axis is fixed throughout processing, the hole will be cylindrical with the exception of the round-off 30 formed by cutting elements at the part 30'. Moreover, it is possible to use the cutting head to form cylindrical holes with diameters greater than the diameter of the cutting head by the axis of rotation 35 of the cutting head following a circular motion throughout processing, i.e. the axis of rotation is moved so that it continuously forms a generatrix for a cylinder surface.

By giving the axis of rotation 35 of the cutting head increased circular motion when the cutting head is in its lower position, the hole can be formed with a conical shape. If the hole is to have an oval shape, the above circular motion is replaced with an oval or elliptical motion. It should be noted here that the axis of rotation of the cutting head can also be designed to follow other curve forms if required.

With the proposed equipment, it is thus possible to form holes to have a diameter which is equal to or greater than the diameter of the cutting head and to give these holes a cylindrical or conical shape. The holes may also be given an oval shape. The holes may be formed with a plane base using cutting elements mounted in the axial part 33' of the arms. Alternatively, the axial areas of the arms may be formed in another way, for example they may be rounded or they may comprise cutting elements which produce a countersunk central part of the hole if this is required.

A processing tool with a radial cutting element which extends outwards (not shown) is used for the formation of threads/tracks in the hole. With the present invention, threads can even be processed in non-cylindrical holes.

Tests carried out show that the proposed processing tool is subject to minimal wear during the processing of carbon bodies and the requirements for the precision and quality of the hole are met. It has been shown that the processing tool cuts the carbon material without chipping or crack formation and the use of any lubricant/coolant has been shown to be superfluous.

Shavings produced during processing are relatively coarse-grained at favorable feed and cutting speeds, and therefore little fine dust is generated.

In the tests, a cycle time of approximately 74 seconds was achieved for processing (drilling and coning) an anode with three nipple holes. The nipple holes had a diameter of 160 mm and depth of 110 mm with coning in the base.

Moreover, comparative tests were carried out in an electrolytic furnace with anodes made in accordance with the present invention and anodes made with preformed holes. These tests show that the contact resistance between the nipple and the anode is lower for anodes made in accordance with the present invention.

It should be understood that the above mentioned control of the processing station may in addition involve that the surface of the carbon body is smoothed with respect to possible grades and uneveness. The carbon body may possibly be turned in an appropriate manner (not shown in the figures) for the processing of other surface sides of the body. The processing as described above may be performed by mutual motion between the tool and the carbon body. Alternatively, the carbon body may be moved with respect to the processing tool (not shown).

What is claimed is:

1. A method of processing carbon bodies, the method comprising:
    forming a calcined carbon body;
    cutting at least one hole in the calcined carbon body, wherein the hole is cut by at least one cutting element which rotates about an axis of rotation.

2. The method as claimed in claim 1, wherein the cutting operation is performed by rotating a plurality of cutting elements about the axis of rotation, each of the cutting elements rotates at a different radial distance from the axis of rotation.

3. The method as claimed in claim 1, further comprising processing wall surfaces of the hole by rotating a plurality of cutting elements about the axis of rotation, wherein each the cutting elements rotate at different axial locations relative to the other cutting elements along the axis of rotation.

4. The method as claimed in claim 3, herein each of the cutting elements rotate at different radial distances from the axis of rotation relative to the other cutting elements.

5. The method as claimed in claim 1, wherein the cutting elements rotate about a horizontal axis during the processing operation.

6. The method as claimed in claim 1, wherein during the processing operation the axis of rotation of the cutting elements is moved along a curved path.

7. The method as claimed in claim 1, wherein during the processing operation the axis of rotation of the cutting elements is moved along a curved path so as to impart a planetary motion to the cutting elements.

8. A method of forming an anode for use in an electrolytic cell for the production of aluminum, the method comprising:
    conveying a calcined carbon body to a positioning device;
    positioning and fixing the calcined carbon body on a horizontal support surface of the positioning device;
    rotating the support surface through a predetermined angle so that a surface of the calcined carbon body opposes a machining unit having at least one processing tool, wherein said processing tool is mounted on a rotatable spindle and has a cutting head formed with a plurality of cutting arms;
    moving the processing tool into contact with the surface of the calcined carbon body; and
    cutting at least one hole in the surface of the calcined carbon body by rotating the processing tool about a horizontal axis of rotation.

9. The method as claimed in claim 8, further comprising moving the axis of rotation along a curved path so as to impart a planetary motion to the cutting head.

10. The method as claimed in claim 9, wherein the planetary motion of the cutting head forms a hole surface that diverges towards a base of the hole.

11. The method as claimed in claim 9, wherein each of the cutting arms includes a plurality of radially spaced cutting elements on a leading end of the arm, and a plurality of axially spaced cutting elements on a radially outer axial surface of the arm.

12. The method as claimed in claim 11, wherein each of the arms diverges radially outwardly in a direction towards a leading end of the cutting head.

13. The method as claimed in claim 8, further comprising calcining a carbon body in a green state to provide the calcined carbon body.

14. A method of forming an anode for use in an electrolytic cell for the production of aluminum, the method comprising:

conveying a calcined carbon body to a positioning device;

positioning the calcined carbon body on a horizontal support surface of the positioning device;

positioning the support surface so that a surface of the calcined carbon body opposes a machining unit having a plurality of processing tools, wherein each of said processing tools is mounted on a rotatable spindle and has a cutting head formed with a plurality of cutting arms;

bringing the processing tools into contact with the surface of the calcined carbon body; and cutting a plurality of nipple holes in the surface of the calcined carbon body by rotating each of the processing tools about an axis of rotation.

15. The method as claimed in claim 14, further comprising moving each of the axes of rotation of the processing tools along a curved path so as to impart a planetary motion to the cutting heads, respectively.

16. The method as claimed in claim 15, wherein the planetary motion of each of the cutting heads forms a hole surface that diverges towards a base of the hole.

17. The method as claimed in claim 15, wherein each of the cutting arms includes a plurality of radially spaced cutting elements at a leading end of the cutting head, and a plurality of axially spaced cutting elements on a radially outer axial surface of the arm.

18. The method as claimed in claim 17, wherein each of the arms diverges radially outwardly in a direction towards a leading end of the respective cutting head.

19. The method as claimed in claim 14, further comprising calcining a carbon body in a green state to provide the calcined carbon body.

* * * * *